US007754023B2

(12) United States Patent
Albu et al.

(10) Patent No.: US 7,754,023 B2
(45) Date of Patent: Jul. 13, 2010

(54) COMPOSITIONS AND METHODS USING A MICROORGANISM CONCENTRATE FOR PAINT OVERSPRAY REMOVAL PROCESSES

(75) Inventors: Michael L. Albu, Troy, MI (US); Timothy P. O'Mara, Grand Blac, MI (US); John J. Boehmer, Leonard, MI (US); Robert N. Deneau, Lake Orion, MI (US); Roger Forsberg, Roncq (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 1200 days.

(21) Appl. No.: 11/004,505

(22) Filed: Dec. 3, 2004

(65) Prior Publication Data
US 2006/0122086 A1 Jun. 8, 2006

(51) Int. Cl.
B08B 7/00 (2006.01)
(52) U.S. Cl. .......................................... 134/38
(58) Field of Classification Search ................. 134/38
See application file for complete search history.

(56) References Cited

U.S. PATENT DOCUMENTS

| 4,377,486 A | | 3/1983 | Barrick et al. | 210/712 |
|---|---|---|---|---|
| 4,472,181 A | * | 9/1984 | Herrlander | 96/235 |
| 5,178,762 A | | 1/1993 | Pokora et al. | 210/632 |
| 5,501,770 A | | 3/1996 | Sarkar et al. | 162/100 |
| 5,827,432 A | | 10/1998 | Huhtamaki et al. | 210/705 |
| 5,836,321 A | * | 11/1998 | Kaneski et al. | 134/10 |
| 6,168,712 B1 | | 1/2001 | Kubo et al. | 210/151 |
| 6,733,673 B2 | | 6/2004 | Sarkar et al. | 210/632 |
| 6,733,674 B2 | | 6/2004 | Sarkar et al. | 210/632 |

FOREIGN PATENT DOCUMENTS

| DE | 41 36 445 A1 | 8/1993 |
|---|---|---|
| FR | 2 328 501 | 5/1977 |
| FR | 2 770 227 | 4/1999 |
| JP | 2001340885 | 12/2001 |
| JP | 2003-251387 | 9/2003 |
| WO | WO 03/010233 A1 | 2/2003 |

OTHER PUBLICATIONS

Bing Qi et al ("screening of fungi for biodegradation of volatile organic compounds", Apr. 20, 2004).*

Bennet et al ("Use of fungi biodegradation" from the manual of Environmental microbiology, ASM Press Washing DC, 2002).*

B.R. Kim, J.A. Adams, P.R. Klaver, E.M. Kalis, M. Contrera, M. Griffin, J. Davidson and T. Pastick, "Biological Removal of Gaseous VOCS From Automotive Painting Operations," Aug. 2000, *Journal of Environmental Engineering*, pp. 745-753.

B. R. Kim, M. Zinbo, J.A. Adams and W. C. Young, "Nonbiodegradable Organic Compounds Found in Automotive Spraybooth Scrubber Water," Jul./Aug. 2000, pp. 405-412, *Water Environment Research*, vol. 72, No. 4.

M.C. Arquiagaq, L.W. Canter and J.M. Robertson, "Microbiological Characterization of the Biological Treatment of Aircraft Paint Stripping Wastewater," 1995 *Elsevier Science Limited*, pp. 189-195.

B.R. Kim, E.M. Kalisa nd J.A. Adams, "Integrated Emissions Management for Automotive Painting Operations," 2001 *Pure Appl. Chem.*, vol. 73, No. 8, pp. 1277-1290.

Ryuichiro Kurane, Kiyoshi Taked and Tomoo Suzuki, "Screening for and Characteristics of Microbial Flocculants," 1986, *Agric. Biol. Chem.*, 50 (9), pp. 2301-2307.

Hiroaki Takagi and Kiyoshi Kadowaki, "Purification and Chemical Properties of Flocculant Produced by *Paecilomyces*," 1985, *Agric. Biol. Chem.*, 49 (11), pp. 3159-3164.

Lawrence E. Neilsen, "Mechanical Properties of Particulate-Filled Systems," *Journal of Composite Materials* vol. 1, 1967, pp. 100-119.

Dr. Jorg Wonnemann, Observations by third parties, Feb. 22, 2009, pp. 1-9, plus claims charts.

* cited by examiner

*Primary Examiner*—Michael Cleveland
*Assistant Examiner*—Samuel A Waldbaum
(74) *Attorney, Agent, or Firm*—Diane R. Meyers

(57) ABSTRACT

A composition and method for treating oversprayed paints in paint spray booths is provided. The method includes contacting the paint overspray with a wash water system comprising an agitated solution containing a microorganism concentrate so as to collect the paint overspray in the agitated solution. The solution containing the paint overspray is passed to a holding area for phase separation into an organic phase containing paint overspray and an aqueous phase. The organic phase containing the paint overspray, which contains the paint solids portion, and, optionally, an organic solvents portion, is separated from the aqueous phase. The wash water system for treating paint overspray in paint spray booths contains a microorganism concentrate in an amount effective in precipitating the paint solids and, optionally, organic solvents, from the system.

5 Claims, No Drawings

COMPOSITIONS AND METHODS USING A MICROORGANISM CONCENTRATE FOR PAINT OVERSPRAY REMOVAL PROCESSES

FIELD OF THE INVENTION

The present invention relates to compositions and methods for paint overspray removal processes.

BACKGROUND OF THE INVENTION

Automatic spraying techniques have long been employed for painting large articles such as cars, trucks, refrigerators, etc. The items being sprayed are generally advanced along a conveyor line that passes through a water wash paint spray booth where a fine spray of paint is directed at the articles being painted from spray guns that are located at the sides of the conveyor. Overspray paint, that is, paint that does not contact the article being painted, forms a fine mist of paint in the air space surrounding the painted article. This paint mist must be removed from the air. To accomplish this, the contaminated air is pulled through the paint spray booth by air exhaust fans. A curtain of circulating water is maintained across the path of the air in a manner such that the air must pass through the water curtain to reach the exhaust fans. As the air passes through the water curtain, the paint mist is "scrubbed" from the air and carried to a sump basin usually located below the paint spray booth. In this area, the paint particles are separated from the water so that the water may be recycled and the paint particles disposed of.

Paint is a tacky material and it tends to coagulate and adhere to the spray booth surfaces, particularly in the sump and drain areas, and must constantly be removed from the sump to prevent clogging of the sump drain and recirculating system. In order to assist in the removal of the oversprayed paint from the air and to provide efficient operation of paint spray booths, detackifying agents are commonly employed in the water used in such systems, and are typically incorporated into the water wash recirculated in the paint spray system. Detackifying the paint eliminates or minimizes the adhesive properties, or tackiness, of the paint, thereby preventing the oversprayed paint from adhering to surfaces, such as sump and drain areas.

One of the difficulties with recovering paint overspray in a water wash spray booth as described above is the limited amount of paint that can be incorporated into the water. As such, detackifying agents should have a high load capacity, such that the water wash recirculated through the spray booth can detackify, coagulate and flocculate a high volume of oversprayed paint before exhaustion.

In recent years, the need to reduce solvent emission has resulted in the reduction of solvent-based or solventborne paints, and an increase in the use of water-based or waterborne paints. Because the hydrophilic properties of the waterborne coating compositions render such compositions readily dispersible or soluble in water, removal of paint solids comprised of components such as organic resins, pigments, and organic solvents, from waterborne paint overspray typically requires the use of different detackifying processes in paint spray booths when compared to solvent-based paints.

Accordingly, further improvements would be a welcome addition to the art, wherein compositions and methods useful for removal of paint overspray from both waterborne and solvent-based paints are employed to effectively decrease the amount of one or more of organic resins, pigments, and organic solvents in paint spray booths.

SUMMARY OF THE INVENTION

The present invention includes methods and compositions for the removal of paint overspray in paint spray booths, the paint overspray containing a paint solids portion and, optionally, an organic solvents portion, the paint solids portion including organic resins and, optionally, pigments. The method comprises contacting the paint overspray with a wash water system comprising an agitated solution comprising a microorganism concentrate so as to collect the paint overspray in the agitated solution; passing the solution containing the paint overspray to a holding area for phase separation into an organic phase containing paint overspray and an aqueous phase; and separating the organic phase containing the paint overspray, which contains the paint solids portion, that includes organic resins and, optionally, pigments, and, optionally, an organic solvents portion, is separated from the aqueous phase.

In another embodiment of the present invention the method for treating overspray paints is similar to the method described immediately above, and further includes treating the organic phase to separate at least a portion of the paint solids from the organic solvent portion, dispersing the organic solvent portion with the agitated solution for subsequent contact with the paint overspray, and recovering the paint solids.

The present invention also provides a wash water system for treating paint overspray in paint spray booths, the paint overspray containing a paint solids portion and, optionally, an organic solvents portion, the paint solids portion including organic resins and, optionally, pigments, the wash water system comprising a microorganism concentrate in an amount effective to precipitate at least a portion of the paint solids and, optionally, organic solvents, from the system.

In another embodiment, the present invention provides a method for the removal of paint overspray comprising the water wash system as discussed above.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It should also be understood that, in this application, use of the singular includes the plural unless specifically stated otherwise.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The term "paint" as used herein is intended to encompass a mixture of resin and, optionally, pigment, and a suitable liquid vehicle that is reasonably fluid and provides a thin and adherent coating when applied to a substrate. As such, the term "paint" is intended to encompass paints, lacquers, varnishes, base coats, clear coats, primers and the like. The term "paint overspray" is intended to include both waterborne and solventborne paints.

The term "coagulant", as used herein refers to a substance that is used in precipitating solids or semi-solids from solution, as polymeric particles from. latex, or impurities from water.

The term "wash water", as used herein, refers to a curtain of circulating water in a paint spray booth, whereby at least a portion of paint mist is "scrubbed" from the air and carried away for further processing.

The term "polymer", as used herein, is meant to refer to oligomers and both homopolymers and copolymers.

In certain embodiments, the present invention is directed to a method for the removal of paint overspray in paint spray booths, the paint overspray containing a paint solids portion and, optionally, an organic solvents portion, the paint solids portion including organic resins and, optionally, pigments, the method comprising: (a) contacting the paint overspray with a wash water system comprising an agitated solution comprising a microorganism concentrate so as to collect the paint overspray in the agitated solution; (b) passing the solution containing the paint overspray to a holding area for phase separation into an organic phase containing paint overspray and an aqueous phase; and (c) separating the organic phase containing the paint overspray, which contains the paint solids portion, that includes organic resins and, optionally, pigments, and, optionally, an organic solvents portion, from the aqueous phase.

The paint solids portion can include organic resins, and optionally pigments and an organic solvents portion. In certain embodiments, the paint solids portion can also include surfactants as are well known in the paint or coatings art.

As indicated, the wash water system comprises an agitated solution comprising a microorganism concentrate. As used herein, the term "microorganism concentrate" refers to an undiluted quantity of living organisms typically having a size so small such that the individual organisms are invisible to the naked eye. Typical sizes of these living organisms may range, for example, from 0.2 microns to 90 microns. These organisms typically are unicellular (single celled) and reproduce themselves without the aid of other organisms.

As aforementioned, paint overspray is a tacky material, and may tend to coagulate. In certain embodiments of the present invention, the microorganisms present in the concentrate used in the wash water system can encapsulate the paint solids portion of the paint overspray, thereby rendering the paint solids non-tacky. This is sometimes referred to as a detackification process. In certain embodiments, the overspray paint may comprise a waterborne paint.

In certain embodiments of the present invention, the microorganism concentrate comprises organisms comprising bacterial organisms, fungal organisms, yeast organisms, or a mixture thereof.

Examples of bacterial organisms that are suitable for use in the present invention include, but are not limited to, gram-positive endospore-forming rods, gram-positive aerobic rods, gram-positive facultatively anaerobic rods, gram-negative facultatively anaerobic rods, gram-negative aerobic rods, or a mixture thereof. In certain embodiments, the bacterial organisms comprise *Bacillus* sp., *Citrobarobacter* sp., *Aeromonas* sp., *Shewanella* sp., *Pseudomonas* sp., *Corynebacterium* sp., *Rhodococcus* sp., or a mixture thereof.

Examples of suitable fungal organisms for use in the present invention include, but are not limited to, *Paecilomyces* sp., *Aspergillus* sp., *Geotrichum* sp., *Phanerochaete chrysosporium,* or a mixture thereof. Examples of suitable yeast organisms include, but are not limited to, *Saccharomyces* sp., *Kluyveromyces* sp., *Pichia* sp., or a mixture thereof.

In another embodiment, the agitated solution of the present invention may further comprise a coagulant that is employed to remove paint overspray in paint spray booths. As described above, paint overspray may contain a paint solids portion and, optionally, an organic solvents portion, the paint solids portion including organic resins and, optionally, pigments. The agitated solution of a coagulant in water can act to demulsify the paint overspray in the agitated solution.

The coagulant of the present invention may be any material and/or mixture of materials effective in precipitating paint solids and, optionally, organic solvents from solution. Non-limiting examples of suitable coagulants that may be employed in the present invention include:

1) a dialkylaminoalkyl (meth)acrylate polymer;
2) a hexosan polymer;
3) a montmorillonite-containing clay;
4) chitosan;
5) a poly[oxyalkylene(dialkylimino)alkylene] polymer solution;
6) a epihalohydrin/dialkylamine polymer;
7) a polydiallydialkylammonium halide polymer;
8) a polyepiamine;
9) an electrolyte/dialkylamine epihalohydrin; and
10) a halide/dialkylamine-epihalohydrin-alkylenediamine polymer;

or a mixture thereof.

It should be noted that any of the above-mentioned coagulants may further include a complex metal salt. The complex metal salt may be any complex metal salt that is capable of coagulating and flocculating paint. In certain embodiments, the complex metal salt comprises aluminum salt. Non-limiting examples of useful complex metal salts comprise aluminum chlorohydrate, aluminum sulfate (alum), zinc chloride, ferric chloride, calcium chloride, magnesium hydroxide, or a mixture thereof. Also, the montmorillonite-containing clay can be used in conjunction with a polymer such as an acrylic polymer, as described below.

The coagulant may be ionic (i.e. anionic or cationic), or nonionic. In some embodiments of the present invention, discussed, herein below, the coagulant comprises a cationic aqueous coagulant solution.

The coagulant of the present invention may include an aqueous solution of a dialkylaminoalkyl (meth)acrylate polymer that, in combination with other components such as a complex metal salt, described below, has been found to provide good dispersion properties to paint overspray coagulant solutions. Suitable examples of dialkylaminoalkyl (meth) acrylate polymers suitable for use in the present invention are dimethylaminoethyl methacrylate ($CH_2{:}C(CH_3)COOCH_2{-}N(CH_3)_2$), and the like. In this embodiment, the dialkylaminoalkyl (meth)acrylate polymer may be present in the wash water system in an amount of from 0.005 to 1.0 percent by weight (50 to 10,000 ppm), and more specifically may be present in an amount of from 0.05 to 0.2 percent by weight (500 to 2000 ppm), based on the total weight of the wash water system. For purposes of the present invention, the term "(meth)acrylic" and terms derived therefrom are intended to include acrylic and methacrylic acid and derivatives thereof.

The dialkylaminoalkyl (meth)acrylate polymer coagulant solution of the present invention may further include a complex metal salt, which is capable of flocculating the oversprayed paint, as described above.

The dialkylaminoalkyl (meth)acrylate coagulant solution of the present invention may include a complex metal salt dissolved therein, as described above. The complex metal salt may be dissolved in the coagulant solution in an amount that is greater than the amount of the aqueous solution of dialkylaminoethyl (meth)acrylate polymer, based on the total weight of the coagulant solution. The complex metal salt may be provided in the coagulant solution in an amount of from 2 to 40 percent by weight, and more particularly of from 10 to 15 percent by weight, based on the total weight of the coagulant solution.

In another embodiment of the present invention, the coagulant may include an aqueous solution of a hexosan polymer (i.e. a polymer of glucose), such as an amylopectin polymer, and, optionally, a complex metal salt as described above. Amylopectin is the outer, most insoluble portion of starch granules, in the form of potato starch, and is a branched molecule of many glucose units that forms a paste in water.

The aqueous solution of hexosan may be provided as a mixture of amylopectin, optionally, a complex metal salt, and water. The hexosan polymer may be present in the wash water system in an amount of from 0.005 to 1.0 percent by weight (50 to 10,000 ppm), and more specifically may be present in an amount of from 0.05 to 0.2 percent by weight (500 to 2000 ppm), based on the total weight of the wash water system.

The hexosan composition of the present invention may include a complex metal salt dissolved therein. The complex metal salt may be dissolved in the coagulant solution in an amount that is greater than the amount of the aqueous solution of hexosan polymer, based on the total weight of the coagulant solution. The complex metal salt may be provided in the coagulant solution in an amount of from 2 to 40 percent by weight, and more particularly of from 10 to 15 percent by weight, based on the total weight of the coagulant solution. The complex metal salt may be any complex metal salt described above, or a mixture thereof.

In another embodiment of the present invention, the coagulant may include a montmorillonite-containing clay and, optionally, a water dispersible polymer, such as an acrylic polymer. If present, the polymer may be provided in an amount of from 0.01 to 1.0 percent by weight, based on the total weight of the coagulant solution.

Suitable montmorillonite clays include bentonite, sodium montmorillonite, calcium montmorillonite and/or magnesium montmorillonite; nontronite; biedellite; volkonskonite; hectorite; saponite; sauconite; sobockite; stevensite; svinfordite; vermiculite and the like. In one embodiment of the present invention, the coagulant solution comprises a bentonite clay. When such a clay is employed, the clay may be present in the coagulant solution in an amount of from 1 to 25 percent, more particularly 5 to 15 percent, and more specifically 5 to 10 percent by weight, based on the total weight of the coagulant solution.

In another embodiment, the present invention may further comprise an agitated solution of a compound having the following structure:

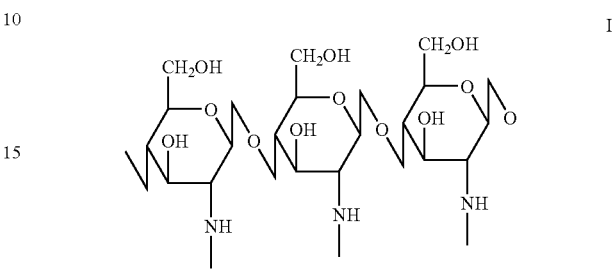

and water, and, optionally, a complex metal salt, capable of flocculating the oversprayed paint, as set forth in U.S. Pat. No. 6,673,263, which is incorporated herein by reference in its entirety. The aqueous solution of the compound identified by structure I above may be an aqueous solution of chitosan, and typically includes a mixture of water, chitosan, and an acid capable of rendering the chitosan soluble in water.

The chitosan may be provided in the aqueous solution as a stock solution for later use in preparation of the coagulant solution of the present invention. The stock solution of chitosan in water may include chitosan in water in an amount of from 0.5 to 5 percent by weight chitosan based on the weight of the stock solution, for example from 0.5 to 3 percent by weight, with amounts of 1 percent by weight typically being employed.

Chitosan is not readily dissolvable in water. Accordingly, various agents can be added to render the chitosan more readily soluble. For example, an acid may be added to the water prior to addition of the chitosan, to provide an acidic aqueous solution for dissolving the chitosan. Examples of useful acids include, acetic acid, sulfuric acid, hydrochloric acid, citric acid, sulfamic acid and mixtures thereof. The acid may be provided in the stock solution in an amount of from 0.5 to 5 percent by weight, based on the weight of the stock solution, for example, from 0.5 to 3 percent by weight.

The chitosan composition of the present invention may include the complex metal salt dissolved therein. The complex metal salt may be dissolved in the coagulant solution in an amount that is greater than the amount of the aqueous solution of chitosan, based on the total weight of the coagulant solution. The complex metal salt may be any complex metal salt described above, or a mixture thereof. The complex metal salt may be provided in the coagulant solution in an amount of from 2 to 40 percent by weight, for example from 10 to 15 percent by weight, based on the total weight of the coagulant solution. The chitosan may be provided in the coagulant solution in an amount of from 0.1 to 10 percent by weight, based on the total weight of the composition. The acid may be provided in an amount of from 0.1 to about 10 percent by weight, based on the total weight of the coagulant solution. The acid and the chitosan are provided in equal amounts, based on the total weight of the coagulant solution.

The aqueous solution of chitosan typically includes a viscosity of from 200 to 3000, for example, 1000 to 1750 centipoise (cps).

In another embodiment, the coagulant of the present invention may include an aqueous cationic polymer, such as, for example, a poly[oxyalkylene(dialkylimino)alkylene] polymer solution. Suitable examples of poly[oxyalkylene(dialkylimino)alkylene] polymers can include poly[oxyethylene(dimethylimino)ethylene] polymers, and the like. In this embodiment, the poly[oxyalkylene(dialkylimino)alkylene] polymer may be provided in the wash water system in an amount of from 0.005 to 1.0 percent by weight (50 to 10,000 ppm), for example from 0.05 to 0.2 percent by weight (500 to 2000 ppm), based on the total weight of the wash water system.

In another embodiment of the present invention, the coagulant may include an aqueous solution of a epihalohydrin/dialkylamine polymer. Suitable examples of a epihalohydrin/dialkylamine polymer can include epichlorohydrin/dimethylamine polymers (EPI/DMA), and the like. In this embodiment, the epihalohydrin/dialkylamine polymer may be present in the wash water system in an amount of from 0.005 to 1.0 percent by weight (50 to 10,000 ppm), for example, from 0.05 to 0.2 percent by weight (500 to 2000 ppm), based on the total weight of the wash water system.

In another embodiment of the present invention, the coagulant may include an aqueous solution of a polydiallydialkylammonium halide polymer. Suitable examples of a polydiallydialkylammonium halide polymer include polydiallydimethylammonium chloride polymers, and the like. In this embodiment, the polydiallydimethylammonium halide polymer may be present in the wash water system in an amount of from 0.005 to 1.0 percent by weight (50 to 10,000 ppm), and for example from 0.05 to 0.2 percent by weight (500 to 2000 ppm), based on the total weight of the wash water system.

Another embodiment of the present invention is directed to a coagulant that includes an aqueous solution of a polyepiamine and, optionally, a complex metal salt as described above. The aqueous solution of polyepiamine typically is provided as a mixture of polyepiamine, optionally, a complex metal salt, and water. The polyepiamine may be present in the wash water system in an amount of from 0.005 to 1.0 percent by weight (50 to 10,000 ppm), for example from 0.05 to 0.2 percent by weight (500 to 2000 ppm), based on the total weight of the wash water system.

The polyepiamine composition of the present invention may include the complex metal salt dissolved therein. The complex metal salt may be dissolved in the coagulant solution in an amount that is greater than the amount of the aqueous solution of polyepiamine polymer, based on the total weight of the coagulant solution. The complex metal salt may be provided in the coagulant solution in an amount of from 2 to 40 percent by weight, for example from 10 to 15 percent by weight, based on the total weight of the coagulant solution. The complex metal salt may be any complex metal salt described above, or a mixture thereof.

In another embodiment of the present invention, the coagulant may include an aqueous solution of an electrolyte/dialkylamine epihalohydrin. Suitable examples of an electrolyte include those electrolytes that provide ionic destabilization of the dispersed paint, and include, for example, sodium chloride, potassium chloride, and magnesium chloride. Suitable examples of the electrolyte/dialkylamine epihalohydrin coagulant of the present invention include sodium chloride/dimethylamine epichlorohydrin, and the like. In this embodiment, the electrolyte/dialkylamine epihalohydrin may be present in the wash water system in an amount of from 0.005 to 1.0 percent by weight (50 to 10,000 ppm), for example from 0.05 to 0.2 percent by weight (500 to 2000 ppm), based on the total weight of the wash water system.

In another embodiment of the present invention, the coagulant may include an aqueous solution of a halide/dialkylamine-epihalohydrin-alkylenediamine polymer. Suitable examples of a halide/dialkylamine-epihalohydrin-alkylenediamine polymer include a chloride/dimethylamine-epichlorohydrin-ethylenediamine polymer. In this embodiment, the aqueous solution of halide/dialkylamine-epihalohydrin-alkylenediamine polymer may be present in the wash water system in an amount of from 0.005 to 1.0 percent by weight (50 to 10,000 ppm), for example from 0.05 to 0.2 percent by weight (500 to 2000 ppm), based on the total weight of the wash water system.

It is contemplated that the aqueous coagulant solutions of the present invention, set forth above, may be employed alone or in combination in the wash water of the paint overspray removal process of the present invention. For example, two or more of the coagulants set forth above may be employed as a coagulant mixture to provide certain cost benefits to the process, or to impart certain property advantages to the process that may not be provided by any one coagulant.

Additionally, other compounds may be included in the composition of the present invention to act as co-flocculants. Useful compounds include amine group-containing polymers, for example, acrylamide polymers, particularly cationic acrylamide polymers. Examples of useful cationic acrylamide polymers include, but are not limited to, dimethylaminoethylmethacrylate sulfuric acid salt, dimethylaminoethylmethacrylate methyl chloride quaternary ammonium salt, dimethylaminoethylmethacrylate methyl sulfate quaternary ammonium salt, dimethylaminoethylacrylate methyl chloride quaternary ammonium salt, acrylamidopropyltrimethyl ammonium chloride, and mixtures thereof.

The coagulant of the present invention is typically prepared by combining the coagulant and water optionally in the presence of an acid, and mixing at a temperature and for a time sufficient to form an aqueous solution of the coagulant.

After formation of the aqueous solution of the coagulant, a portion of this aqueous solution typically is combined with additional water. The complex metal salt, if present, can then be added to the solution, with gentle stirring, to form the coagulant solution. Montmorillonite-containing clay, such as bentonite clay also may be added to the coagulant solution, if desired.

Further, when used in such water systems, the coagulant solution is typically provided in an amount of from 0.01 to 10 percent of the volume of water recirculated through the system, such as in an amount of from 0.005 to 1.0 percent by weight (50 to 10,000 ppm), for example from 0.05 to 0.2 percent by weight (500 to 2000 ppm), based on the total weight of the wash water system.

The water system including the coagulant solution therein typically is maintained at a pH between 6 to 10, such as between 6.5 and 8.0. Because the coagulant solution of the present invention may, in some embodiments, be slightly acidic, the use of the composition in a recirculating water system may affect the pH of the system. Accordingly, the pH of the water system may be adjusted as is known in the art. For example, small increments of liquid caustic soda, i.e., 50% NaOH, may be added to the water system to maintain the pH in the desired range. Such liquid caustic soda may, for example, be added to the water system in a proportion of 0.05 to 1.5 ml liquid caustic soda per 10 ml of wash water.

The microorganism concentrate of the present invention may be prepared in the form of a liquid concentrate, which is intended for addition to water systems for use in paint spray booths. As such, the concentrate can be added to a volume of wash water which is recirculated through a paint spray booth as an initial detackifying additive, and also can be added as a maintenance detackifying additive during operation of the paint spray booth, as will be discussed in more detail herein.

In certain embodiments, the present invention comprises a wash water system for treating paint overspray in paint spray booths, the paint overspray containing a paint solids portion and, optionally, an organic solvents portion, the paint solids portion including organic resins and, optionally, pigments, the wash water system comprising a microorganism concentrate in an amount effective to precipitate at least a portion of the paint solids and, optionally, organic solvents, from the system.

In certain embodiments, the microorganism concentrate comprises no more than 20 volume percent bacterial organisms, no more than 70 volume percent fungal organisms, and no more than 10 volume percent yeast organisms. Volume percent, as used herein, is based on total volume of organisms present in the microorganism concentrate. The volumetric concentration of microorganisms ranges from $10^7$ to $10^9$ colony forming units (cfu) per milliliter (ml) of solution. For example, a 20 volume percent solution of bacterial organisms in water would comprise 20 liters $10^7$ to $10^9$ cfu per ml bacterial organisms and 80 liters water.

As previously mentioned, in accordance with the method of the present invention, oversprayed paint particles in a paint spray booth are treated with a circulating water system comprising a microorganism concentrate, as described above. The microorganism concentrate of the present invention as discussed above may be added to the wash water system of the paint spray booth in any manner known to those of skill in the art. For example, the microorganism concentrate of the present invention may be added directly into the spray booth wash water. The circulating wash water system forms a continuous moving water curtain that scrubs an air flow containing paint overspray so as to collect the paint overspray in the water curtain. Paint spray booths containing continuous curtains of water to scrub air flows containing paint overspray are known in the art, for example U.S. Pat. No. 4,980,030, which discloses typical paint spray booths.

In operation, an object to be painted is placed within the paint spray booth, and is painted using known spray techniques. The overspray paint is contacted with the continuous curtains of water that is pumped through the paint spray booth in known manner. Such contacting of the overspray paint with the wash water system comprising a microorganism concentrate of the present invention causes the paint to flocculate and separate from the wash water, thereby forming a sludge layer on/in the wash water system that is circulated through the paint spray booth. In addition, the microorganism concentrate of the present invention also can detackify the flocculated paint. The amount of the flocculated paint sludge in the water solution is monitored and removed periodically, through known methods.

The effectiveness of the microorganism concentrate is also periodically monitored during operation of the paint spray booth. This may be accomplished by monitoring the tackiness of the paint sludge removed from the paint spray booth. Alternatively, the level of the microorganism concentrate may be monitored to maintain a desired predetermined threshold level of these materials within the wash water. When the wash water fails to effectively detackify the oversprayed paint and/or when the level of the microorganism concentrate drops below a desired predetermined threshold level, a maintenance dosage of the microorganism concentrate of the present invention may be added to the recirculating water, thereby maintaining the effectiveness of the paint spray booth.

It should be understood that the microorganism concentrate of the present invention may be used in any of the paint overspray treatment systems known in the industry. For example, the microorganism concentrate is also suitable for use in dispersion/emulsion paint overspray treatment systems such as those that contain a carbonyl compound selected from 2,2,4-trimethyl-1,3-pentanediol monoisobutyrate, 2,2,4-trimethyl-1,3-pentanedioldiisobutyrate isobutyrate, or a mixture thereof. Examples of such systems are described in U.S. Pat. Nos. 5,198,143; 5,200,104; and 5,464,556.

The microorganism concentrate of the present invention is used in a similar manner when used in connection with either waterborne and solvent-based paint denaturant systems. An example of such a system is described in detail in U.S. Pat. No. 5,223,141, the disclosure of which is incorporated herein by reference in its entirety. Such paint denaturant systems may include in the wash water a dispersion of an organic solvent component in water. The microorganism concentrate of the present invention may be added to the wash water containing such dispersion.

More particularly, the organic solvent component may comprise a single organic solvent or a mixture of organic solvents. Examples of organic solvents useful include alkyl esters of polycarboxylic acids or mixtures of such esters, such as dimethyl adipate, dimethyl glutarate, dimethyl succinate or a mixture thereof; diisobutyl adipate, diisobutyl glutarate, diisobutyl succinate or a mixture thereof.

The organic solvent component that may be used in the method of the invention may have a solubility in water of less than 15 percent, particularly from 1 to 5 percent by weight, and in which the water may be soluble to an extent of less than 15 percent, particularly from 1 to 5 percent by weight; the percentages by weight being based on total weight of water and organic solvent.

Besides the solubility characteristics described above, the organic solvent component may have a specific gravity sufficiently higher or lower than water to facilitate separation of the organic phase from the aqueous phase. Typically, the specific gravity of the organic solvent component is either less than 0.98 or greater than 1.02, particularly from 0.90 to 0.95 or 1.05 to 1.10.

In addition to the solubility and specific gravity properties, the organic solvent component may have a vapor pressure less than 0.1 millimeters of mercury. Low vapor pressures are desirable because less volatile organic content is released to the atmosphere due to evaporation.

As previously mentioned, the organic solvent component (when present) can comprise a single organic solvent or a mixture of organic solvents. Examples of organic solvents which are usable in the method of the invention include alkyl esters of polycarboxylic acids or mixtures of such esters. Typically, these esters are of the following structural formula:

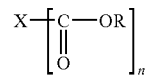

where X is a linear or branched aliphatic group having 2 to 12 carbon atoms or aromatic group having 6 to 20 carbon atoms and R is a linear or branched alkyl group typically containing from about 1 to 8 carbon atoms and n=2 to 4. Substituted aliphatic, aromatic and alkyl groups can be used in which the substituents do not adversely affect the removal and the recovery of the paint overspray components. The alkyl esters also may include dialkyl esters of dibasic carboxylic acids or mixtures of such esters. These esters have the following structural formula:

$$RO-\underset{O}{\overset{\|}{C}}-X-\underset{O}{\overset{\|}{C}}-OR'$$

where X is a linear or branched alkylene group containing from 2 to 12, and more particularly 2 to 8 carbon atoms and R and R' can be the same or different and are linear or branched alkyl containing from 1 to 6, and more particularly from 1 to 4 carbon atoms. Examples of specific alkyl esters of polybasic acids include dimethyl adipate, dimethyl glutarate, dimethyl succinate and mixtures thereof; diisobutyl adipate, diisobutyl glutarate, diisobutyl succinate and mixtures thereof. Mixtures of such esters are available from E. I. Du Pont de Nemours and Company as Dibasic Acid Ester (DBE-3) or Dibasic Acid Diisobutyl Ester (DBE-IB).

Examples of other organic solvents include polyol ethers including mono and diethers of glycols such as mono or dialkyl or mono or diaryl or mixed alkyl and aryl ethers of glycols such as ethylene glycol, diethylene glycol, dipropylene glycol and propanol and mixtures of glycol ethers. Examples of specific polyol ethers include ethylene glycol monobutyl ether, ethylene glycol monophenyl ether, diethylene glycol monobutyl ether, propylene glycol monomethyl ether, propylene glycol monophenyl ether, dipropylene glycol monomethyl ether, dimethylether of ethylene glycol and dimethylether of diethylene glycol. Other examples of organic solvents include furfural alcohol and isophorone.

The concentration of the organic solvent component in the aqueous dispersion is typically from 2 to 50, or from 15 to 25, or from 2 to 10 percent by weight based on weight of organic solvent component and water.

The organic solvent component can be dispersed into the wash water system by simply adding it to the circulating water in a typical water wash spray booth. The microorganism concentrate of the present invention may also be added into the wash water in a similar manner. The pumping and circulation action associated with the spray booth ensures that the organic solvent component will be stably dispersed in the aqueous medium, and ensures that the microorganism concentrate will remain properly mixed in the aqueous medium.

The paint overspray typically contains pigments, organic resins and organic solvent associated with industrial paints. Typical paints are acrylic-based paints, urethane-based paints, base coat/clear coat paints and high solids paints which are used in the automotive, appliance and general industrial markets.

As described above, the paint overspray is contacted with the continuous curtain of wash water that is pumped through the paint spray booth. Paint spray booths containing continuous curtains of wash water to scrub air flows containing paint overspray are know in the art and will not be further described here. Reference is made, however, to U.S. Pat. No. 4,980,030 which discloses typical paint spray booths. Such contacting of the paint overspray with the solution that may include the organic solvent in water and the microorganism concentrate of the present invention collects the paint overspray in the solution.

The solution that contains the paint overspray is pumped through the system in any known manner to a holding area, such as to a sludge tank, from where paint overspray can optionally be removed. The solution can be returned to the paint spray booth to collect additional paint overspray. The continuous circulation and pumping action keeps the solution agitated and stable. In certain embodiments, mechanical means may be employed to remove the paint sludge (which includes paint solids, and possibly organic solvents) from the wash water system. In other embodiments, this holding area may be relatively free of agitation so as to cause the solution to spontaneously phase separate into an organic phase and an aqueous phase. The organic phase that contains most if not all of the paint overspray is separated from the aqueous phase. The paint sludge can optionally be removed from the wash water system.

The inclusion of the aqueous solution of coagulant solution facilitates partial demulsification of the paint overspray from the aqueous phase and imparts a capacity to reduce dispersion of the solvent layer (if present), and decreases the time for phase separation. It is also contemplated that at the holding tank, at least a portion of the aqueous phase from this area may be removed so that the coagulant solution may be added thereto for recirculation to the spray booth.

The organic phase may be further separated into an organic solvent portion and a portion that contains paint solids that comprise organic resin and, optionally, pigment. Typical separating units can include, for example a distillation column, a thin film evaporator or a centrifuge. The organic solvent portion (which contains the organic solvent component initially used to formulate the solution as well as at least a portion of the organic solvent component associated with the paint) is recovered in either the distillate or centrifugate, and may be returned to the recirculating system, where it can be readily dispersed. The paint solids as separated may be reclaimed for further use or may be disposed of. Because the paint is uncured, it can be used as curable filler in adhesives or in paints.

The microorganism concentrate of the present invention may be employed in wash water systems to aid in the removal of paint overspray from paint spray booths. The microorganism concentrates of the present invention have been found to be particularly useful for removal of waterborne paint overspray from spray booths.

Illustrating the invention are the following examples, which are not to be considered as limiting the invention to their details. All parts and percentages in the examples as well as throughout the specification are by weight unless otherwise indicated.

EXAMPLES

Example 1

Example 1 demonstrates paint detackification with a microorganism concentrate of *Bacillus* sp. organisms.

A microorganism concentrate of $>10^7$ per mL of *Bacillus* sp. organism, commercially available from Harvard Chemical Research, Atlanta, Ga., as S-29 10X, was used. Ten (10) mL of this microorganism concentrate was incorporated into the recirculation system of a paint spray booth similar to those described in U.S. Pat. No. 5,116,514. In particular, the recirculation system was charged with an amount so as to provide the recirculation system with a level of 500 parts per million (500 ppm) of the microorganism concentrate. 0.3 mL of a 50% aqueous solution of sodium hydroxide was added to adjust the pH of the system. The pH of the system was measured as 9.0, and the temperature was 70° F.

The recirculation system in the paint spray booth was then turned on. The paint spray booth was used to spray a clearcoat coating available from PPG Industries, Inc., as DCT5002H Diamond Coat® clearcoat. 100 mL of clearcoat was sprayed at a rate of 2 mL per minute into the paint spray system.

During spraying, the recirculation system including the microorganism concentrate had a moderate detackifying effect on the paint. The paint slightly re-livened when rolled between the fingers. The entire amount of clearcoat (100 mL) was sprayed into the recirculation system without failure, failure indicated by livened or sticky paint present in the apparatus.

The degree of detackification is characterized as follows:

TABLE 1

| | |
|---|---|
| Poor Detackification | Detackified paint is sticky and cannot be rolled and rerolled between the fingers. The detackified paint cannot be washed from fingers without solvent. |
| Moderate Detackification | Detackified paint can be rolled and rerolled between fingers. Detackified paint is sticky when squeezing between fingers. Detackified paint can be washed from fingers. |
| Excellent Detackification | Detackified paint can be rolled and rerolled between fingers. Detackified paint is slightly sticky when squeezing. Detackified paint can be washed from fingers. |
| Over Detackification | Detackified paint is a soupy sludge. Detackified paint is non-sticky when squeezing between fingers. |

Example 2

A culture of *Phanerochaete chrysosporium* (American Type Culture Collection ATCC #24725) was cultured in the laboratory by rehydrating the freeze-dried culture with 1 mL of Difco YM Broth (Cat. #271120). The rehydrated culture was aseptically added to 200 mL of additional YM Broth in a 500 mL Erlenmeyer flask and incubated with shaking at 25° C. for five days. 5 mL of this microorganism concentrate was used to charge the recirculator as described in Example 1, so as to provide the recirculation system with a level of 250 parts per million (250 ppm) of the microorganism concentrate. The pH was measured as 7.0, and no adjustments to pH were made. 100 mL of DCT5002H Diamond Coat® (available from PPG Industries, Inc.) clearcoat was sprayed into the recirculator as described in Example 1. The microorganism concentrate in this Example had a moderate detackification effect on the paint (see description in Table 1 of Example 1).

Example 3

A culture of *Bacillus coagulans* (ATCC #7050) was cultured in the laboratory by rehydrating the freeze-dried culture with 0.5 mL of Difco Nutrient Broth (Cat. #23400). The rehydrated culture was aseptically added to 250 mL of additional Nutrient Broth in a 500 mL Erlenmeyer flask and incubated with shaking at 25° C. for four days. 10 mL of this microorganism concentrate was used to charge the recirculator as described in Example 1, so as to provide the recirculation system with a level of 500 parts per million (500 ppm) of the microorganism concentrate. The pH was initially measured as 6.0 and no adjustments to pH were made. 10 mL of DCT5555 Diamond Coat® clearcoat (available from PPG Industries, Inc.) was sprayed into the recirculator system as described in Example 1. This resulted in excellent detackification (see description in Table 1 of Example 1). The pH of the solution was increased to 8.5 with the addition of 0.3 mL of 50% aqueous solution of sodium hydroxide. An additional 30 mL of DCT5555 Diamond Coat® clearcoat was sprayed with moderate detackification resulting.

Example 4

A culture of *Citrobacter fruendii* (ATCC #6879) was cultured in the laboratory by rehydrating the freeze-dried culture with 0.5 mL of Difco Nutrient Broth (Cat. #23400). The rehydrated culture was aseptically added to 200 mL of additional Nutrient Broth in a 500 mL Erlenmeyer flask and incubated with shaking at 25° C. for four days. 10 mL of this microorganism concentrate was used to charge the recirculator as described in Example 1, so as to provide the recirculation system with a level of 500 parts per million (500 ppm) of the microorganism concentrate. The pH was initially measured as 6.0 and no adjustments to pH were made. 15 mL of DCT5555 Diamond Coat® clearcoat was sprayed into the recirculator system as described in Example 1. This produced moderate to poor detackification (see description in Table 1 of Example 1). The pH was then adjusted to 8.5 with the addition of 0.3 mL of 50% aqueous solution of sodium hydroxide, and excellent detackification was noted during the remainder of the trial.

Example 5

A culture of *Rhodococcus erythropolis* (ATCC #17895) was cultured in the laboratory by rehydrating the freeze-dried culture with 1 mL of Difco Nutrient Broth (Cat. #23400). The rehydrated culture was aseptically added to 200 mL of additional Nutrient Broth in a 500 mL Erlenmeyer flask and incubated with shaking at 25° C. for ten days. 10 mL of this microorganism concentrate was used to charge the recirculator as described in Example 1, so as to provide the recirculation system with a level of 500 parts per million (500 ppm) of the microorganism concentrate. The initial pH was measured as 7.0 and was not adjusted. DCT5555 Diamond Coat® clearcoat was sprayed into the recirculator system as described in Example 1. This produced excellent detackification results as characterized in Table 1 of Example 1. Black Polycron® III (available from PPG Industries, Inc.) was also sprayed into the recirculator system as described in Example 1. This produced excellent detackification results.

Example 6

Three (3) different microorganism concentrates were evaluated for detackification effectiveness on a waterborne basecoat. 300 mL of each microorganism concentrate was prepared in beakers as listed below.

Beaker 1—*Paecilomyces* sp. microorganism concentrate.

Beaker 2—*Rhodococcus* sp. microorganism concentrate.

Beaker 3—1:1 mixture by volume of *Paecilomyces* sp. and *Rhodococcus* sp. microorganism concentrates.

Each microorganism concentrate was inoculated with 2 mL of HWB 73879 Red Waterborne Basecoat (available from PPG Industries, Inc.) to determine if they could induce detackification of the waterborne paint solids. This was attempted at both ambient pH and after the pH had been adjusted to 8.5 with the addition of 50% aqueous solution of sodium hydroxide.

The *Paecilomyces* sp. (ATCC #20463) microorganism concentrate cultured in the laboratory in Difco YM Broth produced excellent detackification at both ambient pH of 8.0 and after the pH had been adjusted to pH of 8.5. The *Rhodococcus* sp. (ATCC #17895) microorganism concentrate cultured in the laboratory in Difco Nutrient Broth produced excellent detackification at both an ambient pH of 7.5, and an adjusted pH of 8.5 (adjusted with 50% aqueous sodium hydroxide). The best detackification resulted with the 1:1 volumetric mixture of *Paecilomyces* sp. and *Rhodococcus* sp. as the microorganism concentrate.

Example 7

Four (4) different microorganism concentrates, a quantity of 300 mL each, were prepared. The four (4) microorganism concentrates included *Paecilomyces* sp., *Rhodococcus erythropolis*, *Paecilomyces* sp.+*Rhodococcus erythropolis*, and *Bacillus coagulan*.

Next, a chitosan/aluminum chlorohydrate solution was prepared as follows. First, an aqueous chitosan solution was prepared by combining 1% chitosan and 1% acetic acid in water. Next, 25 grams of this aqueous chitosan solution and 25 grams of a 50% aluminum cholorohydrate solution was mixed with 50 grams of deionized water to produce the chitosan/aluminum chlorohydrate solution.

A quantity of 0.5 mL of the chitosan/aluminum chlorohydrate solution was added to each of the four microorganism concentrates. Each sample was inoculated with 2 mL of HWB 73879 Red Waterborne Basecoat (available from PPG Industries, Inc.) to determine if it could induce detackification of the waterborne paint solids. This was attempted at both ambient pH and after the pH had been adjusted to 8.5 with the addition of a 50% aqueous solution of sodium hydroxide.

The two (2) samples incorporating the *Paecilomyces* sp. microorganism concentrate produced excellent detackification, whereas the other two samples produced moderate detackification (see description in Table 1 of Example 1).

Example 8

This example demonstrates the paint detackification ability of a composition comprised of equal amounts of the *Bacillus* sp. S-29 10X microorganism concentrate prepared as noted in Example 1 and a chitosan/aluminum chlorohydrate solution as prepared in Example 7. Both solventborne and waterborne paints were respectively detackified and coagulated.

As described in Example 1, the recirculator was charged with 5 mL of the *Bacillus* sp. S-29 10X microorganism concentrate described in Example 1 (250 ppm) together with 5 mL of a chitosan/aluminum chlorohydrate solution (250 ppm) prepared as discussed in Example 7. The recirculator water was adjusted to a pH of 8.5 by the addition of 0.4 mL of a 50% aqueous solution of sodium hydroxide.

36 mL of PPG DCT5002H Diamond Coat® clearcoat (available from PPG Industries, Inc.) was sprayed into the recirculator resulting in excellent detackification (see description from Table 1 of Example 1).

Next, the recirculator was charged with 10 mL of HWB 83542 White Waterborne Basecoat (commercially available from PPG Industries, Inc.). This paint immediately coagulated upon introduction to the solution and was further agglomerated upon the addition of 5 mL of 0.5% inversion of a cationic polyacrylamide flocculant (available from PPG Industries, Inc. as PPG BCTL2100).

What is claimed is:

1. A method for the removal of paint overspray in paint spray booths, the paint overspray containing a paint solids portion and, optionally, an organic solvents portion, the paint solids portion including organic resins and, optionally, pigments, the method comprising:

a. contacting the paint overspray with a wash water system comprising an agitated solution comprising a microorganism concentrate so as to collect the paint overspray in the agitated solution;

b. passing the solution containing the paint overspray to a holding area for phase separation into an organic phase containing paint overspray and an aqueous phase; and c. separating the organic phase containing the paint overspray, which contains the paint solids portion, that includes organic resins and, optionally, pigments, and, optionally, an organic solvents portion, from the aqueous phase.

2. The method of claim 1, wherein the microorganism concentrate comprises organisms comprising bacterial organisms, fungal organisms, yeast organisms, or a mixture thereof.

3. The method of claim 2, wherein the fungal organisms comprise *Paecilomyces* sp., *Aspergillus* sp., *Geotrichum* sp., *Phanerochaete Chrysosporium*, or a mixture thereof.

4. The method of claim 1, wherein the overspray paint comprises a waterborne paint.

5. The method of claim 1, wherein the holding area comprises an area relatively free of agitation so as to cause the solution to spontaneously phase separate into an organic phase containing paint overspray and an aqueous phase.

* * * * *

(12) INTER PARTES REEXAMINATION CERTIFICATE (0301st)

United States Patent
Albu et al.

(10) Number: US 7,754,023 C1
(45) Certificate Issued: Sep. 13, 2011

(54) COMPOSITIONS AND METHODS USING A MICROORGANISM CONCENTRATE FOR PAINT OVERSPRAY REMOVAL PROCESSES

(75) Inventors: Michael L. Albu, Troy, MI (US); Timothy P. O'Mara, Grand Blac, MI (US); John J. Boehmer, Leonard, MI (US); Robert N. Deneau, Lake Orion, MI (US); Roger Forsberg, Roncq (FR)

(73) Assignee: PPG Industries Ohio, Inc., Cleveland, OH (US)

Reexamination Request:
No. 95/001,514, Jan. 21, 2011

Reexamination Certificate for:
Patent No.: 7,754,023
Issued: Jul. 13, 2010
Appl. No.: 11/004,505
Filed: Dec. 3, 2004

(51) Int. Cl.
*B08B 7/00* (2006.01)

(52) U.S. Cl. .......................................................... 134/38
(58) Field of Classification Search ..................... 134/38
See application file for complete search history.

(56) References Cited

U.S. PATENT DOCUMENTS

2003/0026906 A1    2/2003    Albu et al.

FOREIGN PATENT DOCUMENTS

| FR | 2 770 227 | 4/1999 |
| JP | 2001-286800 | 10/2001 |
| JP | 2003-251387 | 9/2003 |

*Primary Examiner* — Krisanne Jastrzab

(57) ABSTRACT

A composition and method for treating oversprayed paints in paint spray booths is provided. The method includes contacting the paint overspray with a wash water system comprising an agitated solution containing a microorganism concentrate so as to collect the paint overspray in the agitated solution. The solution containing the paint overspray is passed to a holding area for phase separation into an organic phase containing paint overspray and an aqueous phase. The organic phase containing the paint overspray, which contains the paint solids portion, and, optionally, an organic solvents portion, is separated from the aqueous phase. The wash water system for treating paint overspray in paint spray booths contains a microorganism concentrate in an amount effective in precipitating the paint solids and, optionally, organic solvents, from the system.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*